United States Patent

[11] 3,587,292

[72] Inventors Richard Lapham Gilbert, Jr.
Princeton;
Paul William Knapp, Yardville, N.J.
[21] Appl. No. 814,988
[22] Filed Apr. 10, 1969
[45] Patented June 28, 1971
[73] Assignee American Cyanamid Company, Stanford, Conn.

[54] METHOD FOR DETERMINING SUSCEPTIBILITY OF UREA TO CAKING ON AN ACCELERATED BASIS
4 Claims, 4 Drawing Figs.
[52] U.S. Cl. .................................................. 73/15.4, 73/81
[51] Int. Cl. ...................................................... G01n 25/00, G01n 3/48
[50] Field of Search ............................................ 73/15.4, 78, 81, 84

[56] References Cited
UNITED STATES PATENTS
3,481,187  12/1969  Passmore ..................... 73/81
3,501,942  3/1970  Fitzgerald ..................... 73/15.4

Primary Examiner—James J. Gill
Assistant Examiner—Herbert Goldstein
Attorney—Lawrence W. Flynn ABSTRACT: Urea in any of a variety of forms, either with or without anticaking additives, is placed in a perforated mold and subjected to an environmental cycle comprising a first half cycle of a high temperature-low humidity environment and a second half-cycle of a low temperature-high humidity environment to thereby simulate a typical diurnal cycle. The urea is maintained at a pressure of 2 to 6.5 p.s.i.g., during the cycle and from 2-½ to 20-½ cycles are required to produce useful results. The method produces accurate and useful quantitative data with test durations as short as 0.3 days although a test period of 2—4 days is preferable. The method finds utility by providing a quick evaluation of the efficacy of various urea anticaking additives.

INVENTORS
RICHARD L. GILBERT JR.
PAUL W. KNAPP
BY

Lawrence W. Flynn

AGENT

3,587,292

METHOD FOR DETERMINING SUSCEPTIBILITY OF UREA TO CAKING ON AN ACCELERATED BASIS

BACKGROUND OF THE INVENTION

The problem of fertilizer caking has existed since the beginning of the manufacture of synthetic fertilizers. Many fertilizer components, or their reaction products with other components are hygroscopic. It is known (Silverberg, J. et al., *J. Ag. Food Chem.* 6 442. [1958]) that caking is promoted by movement of moisture which leads to formation of crystal bridges between particles. With the advent of high analysis fertilizers, particularly ammonium nitrate, urea, and mixtures containing these materials as components, problems of caking have multiplied.

In the investigation of factors responsible for caking, and in development of conditioners to reduce caking, it is necessary to have a caking test for evaluation.

The traditional caking test is the stacked bag test, in which the test sample, in a standard fertilizer bag, is placed at the bottom of a stack of bagged goods 15 to 20 bags high. In some tests the bagged goods are replaced by an equivalent weight. The extent of caking of the sample is evaluated after 1 to 3 months. Evaluation is usually qualitative, by inspection, or semiquantitative, by screening the material and weighing lumps, or by counting the number of times the bag must be dropped to break up lumps.

This type of test is a "real" test, in that it shows what would happen in an actual storage situation. Although it is too cumbersome and time consuming to be used in screening potential conditioners, it is the ultimate test with which any accelerated test must be correlated.

Modified bag storage tests using smaller amounts of material have been reported (Bridger, G. L., et al., *Proc. Fertilizer Round Table* p. 94[1966], Iannicelli, J. *Proc. Fertilizer Round Table*, p. 89[1966], Pierce, J. B., Abstracts 152nd National Meeting of American Chemical Society, New York, N.Y., Sept. 1966 p. J20, Rosenblatt. T. M. and Geissler, P. R., Abstracts 152nd National Meeting of American Chemical Society New York, N.Y. Sept. 1966 p. J21). Although these tests reduce the amount of material needed, they do not materially reduce the length of time required for a test.

Numerous accelerated caking tests have been developed in the past 30 years. A pressure bomb test (Adams, J. R. and Ross, W. H., *Ind. Eng. Chem.* 33 120[194) was applied to several types of fertilizer materials in an extensive investigation of the variables influencing test results. This test has been used (Hardesty, J. O. and Kumagai, R., *Agricultural Chem.*, Feb. 38, Mar. 55[1952], Kumagai, R. and Hardesty, J. O., *J. Ag. Food Chem.* 4 132[1956]) in an investigation of the effectiveness of conditioners on granular mixed goods. In this test the hardness of the cake formed in the bomb, by mechanical pressure, was measured by crushing it in a hydraulic press.

In another test applied to mixed goods (Whynes, A. L. and Dee, T. P., *Jour. Sci. Food Agriculture* 8 577[1957]), a cake was formed by air pressure on a sample sealed in a rubber sleeve; caking was evaluated by crushing the sample, still in the sleeve, with a hydraulic press.

Numerous tests have been developed specifically for ammonium nitrate (Whetstone, J. *The Industrial Chemist* Aug., p. 401[1949]. Varma. S., et al., *J. Sci. Ind. Res.* 18B 118[1959], Wilson, J. R., et al., *Agricultural Chemicals* Sept. p. 42[1962], and Iannicelli [1966] supra). Whetstone and Varma allowed ammonium nitrate to absorb water, and then to dry, and measured the hardness of the cake by crushing or with a penetrometer. Wilson and Iannicelli caused caking of ammonium nitrate by repeated cycling through the 32° C. transition point, while maintaining the material under pressure. Both measured the hardness of the cake by crushing with a hydraulic press.

Other tests of a general nature have been described (Mischel, P. B., *Farm Chemicals* Sept., p. 43[1967], and Parks, J. R. and Granok, *J. Farm Chemicals* Oct., p. 51[1967]). No test, however, has been designed specifically for evaluating caking of urea, and none of the tests described above is completely satisfactory for such use. A major disadvantage of the Adams and Ross pressure bomb test is the problem of sealing the joints of the bomb to prevent passage of water vapor. Furthermore, this test cakes urea only when the water content is relatively high.

Through use of a rubber sleeve to form cakes, the Whynes and Dee test tends to give cakes of variable dimensions, a disadvantage when the strength of the cake is to be measured by crushing.

Tests developed for ammonium nitrate, which depend on repeated cycling through the 32° C. transition point to produce caking do not work with urea, which has no such transitions.

In 1966 Geissler and Rosenblatt discussed simulated storage tests on various fertilizers at the Sept. Meeting of the American Chemical Society (New York, N.Y.) and indicated that urea is the only fertilizer about which major reservations are harbored with regard to simulated storage results. At the present time, applicants are unaware of any known method which is entirely suitable for evaluating the caking characteristics of urea on an accelerated or simulated basis.

The method of this invention provides an accelerated caking test, specifically for use with urea, the results of which correlate with stacked bag tests. The method depends upon cycling the test sample, under pressure in a perforated mold, through high temperature-low humidity and low temperature-high humidity conditions, simulating day and night summer atmospheres.

SUMMARY OF THE INVENTION

This invention relates to a method for determining the susceptibility to caking of urea or urea containing anticaking agents on an accelerated basis. This method, moreover, provides quantitative results which correlate with actual bag testing in fertilizer plants.

The term "urea" as used hereafter means urea per se and urea which has been treated with one or more additives with the purpose of reducing the undesirable caking tendencies of urea during storage. The term "urea" is meant to include all of the physical forms of urea commonly utilized in the fertilizer industry such as, for example, urea crystals, microprills, prills, fertilizer grade prills, granulated urea and such. The precise descriptions of such forms of urea are well known to those skilled in the art and do not bear repeating herein.

In accordance with the method of this invention the susceptibility of urea to caking can be accurately and quantitatively determined by a. placing a sample of urea in a perforated mold and subjecting it to an environment cycle consisting of a first half cycle of
  i. from about 2 to about 8 hours at a dry bulb temperature of about 90° F. to 120° F., a pressure of about 2 to 6.5 pounds per square inch gauge (p.s.i.g.) and relative humidity which is below the critical humidity of urea at the temperature selected but in excess of 10 percent followed by a second half cycle of
  ii. from about 1 to about 5 hours at a dry bulb temperature of about 60° to 80° F., a pressure of about 2 to 6.5 p.s.i.g. and a relative humidity of 70 percent to 100 percent and then
b. measuring the crush strength of the urea as treated in (i) and (ii).

The above cycle must be repeated at least 2½ times and may be repeated as many as 20½ times with satisfactory results.

The first half cycle (i) simulates the high temperature-low humidity conditions ordinarily existing during daytime in the summer. The second half cycle (ii) simulates the low temperature-high humidity conditions existing at nighttime during the summer. By combining both half cycles a diurnal cycle is simulated, a factor of substantial significance with regard to the accuracy and reliability of the method.

Moreover, it has been found that if pressures in excess of 6.5 p.s.i.g. are used, the results become inconsistent and contradictory when compared with the results of bag testing resulting in a unreliable test procedure.

In carrying out the first half cycle (i) it becomes necessary to know the critical humidity of urea at the selected temperature. FIG. 1 presents a plot of the critical humidity of urea as a function of temperature and can be used for this purpose.

The method of this invention finds utility by providing an accelerated quantitative method for determining the efficacy of various urea anticaking additives. The only heretofore satisfactory method of evaluation in the case of urea was the bag tests of at least 1 month duration and preferably 3 months duration. As discussed hereinabove bag tests were at most semiquantitative in nature. The method of this invention provides useful quantitative results with test periods ranging from only 0.3 to 11 days in duration, with test periods of 2 to 4 days being preferred. The crush strength measurement is an indication of the degree of caking and is readily converted to a "cake index" by simply dividing the crush strength of an untreated urea control sample by the crush strength of the sample. The cake index can then be used as a quantitative basis for comparing the efficacy of various anticaking agents added to the urea.

The test is similarly useful in arriving at the optimum amounts of anticaking agent required or at the proper order of addition when more than one agent is to be used.

DESCRIPTION OF THE PREFERRED EMBODIMENTS

Test Molds

Figure 1:
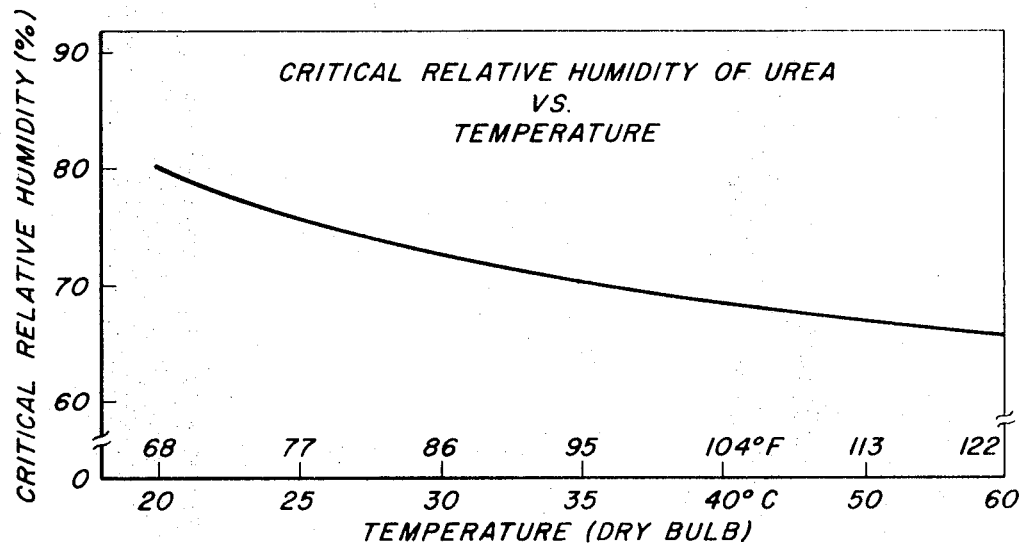
FIG. 1 is a plot of the critical humidity of urea as a function of dry bulb temperature.

The mold used may be of any suitable geometric configuration and may exhibit wide variation in the type and distribution of perforations. Thus it may be square, rectangular, cylindrical, spherical or such. It is desirable that the perforations be such as to permit the urea to be contained in the mold in a substantially rigid and unchanging geometric configuration in order to obtain a urea sample of substantially uniform dimensions from test to test and thereby reduce errors in the measurement of the crush strength of the sample. For the same reason, the perforated mold should possess sufficient rigidity to resist deformation when pressure is applied to the urea sample contained therein.

It is important to maintain constant dimensions of the sample cake from test to test in order to avoid inconsistencies in the crush strength measurement.

The crush strength is the maximum force required to push a pointed spike into the sample until there is no further increase in pressure. The crush strength measurement is a standardized and well-known test procedure and a variety of commercial equipment is available for performing it.

Environmental Conditions

In a series of preferred embodiments of the invention, the first half cycle (i) conditions are:
  100°—110° F.
  50—55 percent relative humidity
  3—4 p.s.i.g., and
  4—6 hours
and the second half cycle conditions are:
  68°—70° F.
  78—82 percent relative humidity
  3—4 p.s.i.g.
  1—3 hours
with the number of total cycles ranging from 8½ to 15½.

A specific set of conditions which has produced excellent test results is as follows:
  first half cycle:
   104° F.
   53 percent relative humidity
   3 p.s.i.g.
   4 hours
  second half cycle:
   68° F.
   81 percent relative humidity
   3 p.s.i.g.
   2 hours
for a total of 11½ cycles.

It is desirable to always begin and end the environmental conditioning of the urea with the high temperature-low humidity half cycle, i.e. the first half cycle (i). When this procedure is followed the total number of cycles used will always be expressed in terms of an integer and the fraction, ½. For example if one begins with the first half cycle (i) and carries out 11 complete cycles, the test will conclude at the end of the second half cycle of the 11th cycle. Since it is desirable to conclude the test with the first half cycle (i) conditions, the test will be carried an extra half cycle concluding at the end of the first half cycle (i) thus resulting in 11½ cycles.

Equipment and Test Procedures

A general outline of the preferred equipment and procedures employed is provided below:

Equipment

1. Molds in which urea cakes were formed were split cylinders, 2 inches in diameter and 2 inches high, made of 16 gauge perforated metal with one-sixteenth inch perforations on one-eighth inch centers (triangular pitch). On either end of the cylinder, to retain the urea, was placed a disc of 0.004 inch polyethylene film and a disc of one-sixteenth inch aluminum sheet 1⅞ inches in diameter.

2. The test rack, in which the molds were placed for application of pressure, comprised an inverted "T" made of three-eighths inch aluminum plate. The test molds rested on the base formed by the cross bar of the inverted "T," while on either side of the vertical perpendicular plate were bolted three air cylinders. (Alkon Products, Wayne, N.J. Series D Model 24, 6 inches stroke). Each test rack could therefore accept six molds. Low pressure air was supplied to the cylinders through a Moore Nullmatic regulator (Model 41—30). Pressure was measured by a test gauge.

3. The test racks were set inside an American Instrument Climate-Lab, Model 4-5500. Cams for the cycle timer of this instrument were cut to give the desired time-temperature-relative humidity.

4. Hardness of the urea cakes was measured with a Dillon Multi Low Range Tester, with a compression cage. The upper platen of the cage was drilled and tapped to accept a ¼–20 NC stainless steel machine screw, the end of which was turned to a 60° cone.

5. Solid conditioners were applied to urea experimentally with a Patterson-Kelly laboratory model Twin-shell blender. Liquids were applied by spraying with a DeVilbiss atomizer onto a rolling bed of urea prills, in a pill-coater or similar device.

Procedures

1. Formation of Cakes

The bottom of the test mold was covered with a piece of paper, held on with masking tape. An aluminum disc and then a polyethylene disc were put in the bottom of the mold, 50 grams of urea prills was added, and finally another polyethylene and an aluminum disc were placed on top of the urea. The polyethylene facilitates removal of the aluminum discs at the conclusion of the test. The assembly was placed in the test rack directly under the air cylinder. The test rack was placed in the Climate-Lab, and the desired air pressure applied under the desired conditions of temperature and humidity.

Twelve samples were tested simultaneously. The position of the samples in the test rack was chosen at random. In general each set of samples was tested three times (further replication did not improve precision) and the average value of cake hardness was calculated. In a series of tests the average value of cake hardness was calculated. In a series of tests the average standard deviation was found to be ±10—20 percent, satisfactory for the purposes intended.

2. Measurement of Cake Hardness

A ¼–20 stainless steel machine screw, with a 60 percent conical end, was installed in the compression cage of the tester, to bear upon the top of the cake.

The test cake, still in its mold, (but with aluminum and polyethylene discs removed) was placed in the cage and the force needed to rupture the cake was measured. The cake ruptured downward, from the point of the spike, in roughly a 60° cone. Most of the prill-prill bonds within this cone of material were broken. Utility The method of this invention is useful as a means of predicting the efficacy of various urea anticaking agents in a very short time as compared to the 1 month or 3 month bag test which had previously been used.

Figure 2:
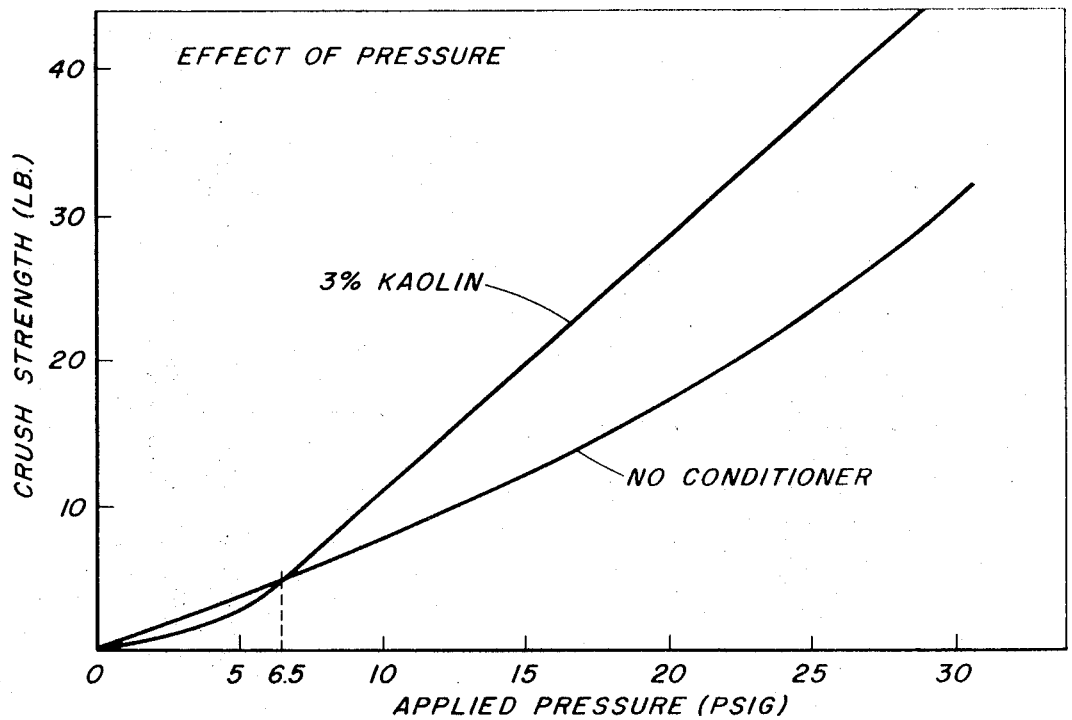
FIG. 2 depicts the effect of pressure applied during accelerated testing upon crush strength of the urea cake.

Before an accelerated method can be accepted, it must be demonstrated that it produces results which are in accord with actual results i.e. as indicated by bag tests. For example, it is known that kaolin clay is a widely used urea anticaking agent. Thus a comparison of results from a suitable accelerated test on a kaolin treated urea and untreated urea should indicate a higher degree of caking in the untreated urea than in the treated urea. We have found that in order to obtain such consistency in our procedure, it is imperative that the pressure be kept below about 6.5 p.s.i.g. The reason for this is clearly shown in FIG. 2 wherein the effect of varying pressure upon urea crush strength is presented for an untreated urea sample and urea treated with 3 percent kaolin subjected for 18 hours to a temperature of 130° F. and 55 percent R. H. followed by a 2 hour period at 130° F. and 25 percent R. H. The data of FIG. 2 show that as pressure exceeds 6.5 p.s.i.g. the test is no longer indicative of the actual effect observed since the treated urea has a higher crush strength greater than that of the untreated urea.

Figure 3:
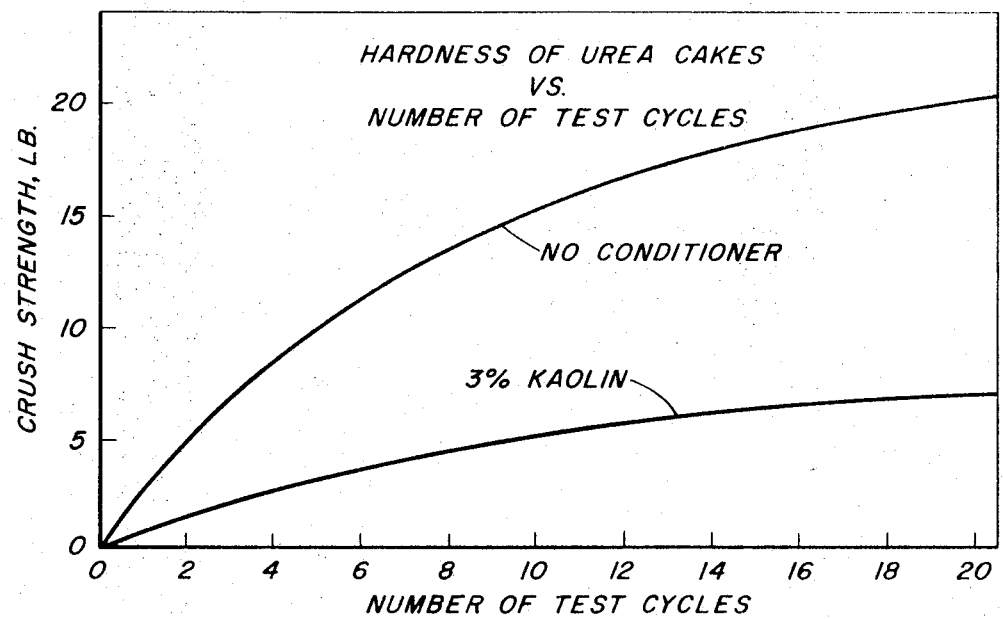
FIG. 3 depicts the effect of the number of environmental cycles to which the urea is subjected in the accelerated test upon crush strength of the urea cake.

FIG. 3 presents data illustrating the effect of the number of cycles upon the test results where the environmental conditions consist of a first cycle (i) at 104° F., 53 percent R. H. and 3 p.s.i.g. for 4 hours and a second cycle (ii) at 68° F., 81 percent R. H., 3 p.s.i.g. for 2 hours. The data show that a comparison of the crush strength of the untreated and treated urea corresponds over a larger number of cycles to that actually observed in bag tests. To obtain accurate results, it is desirable to use at least 2½ cycles in order to be in the range where significant differences in crush strength begin to appear between the treated and untreated urea and where the crush strength values are of sufficient magnitude to permit their measurement without undue error.

To validate the test stacked-bag tests were performed at two producing plants: one at Niagara Falls, Canada, and the second near New Orleans, La. Individual batches of experimentally conditioned urea microprills were made at each site, using freshly produced prills. Bags were stacked 15 high, with the test bags at the bottom. The condition of the samples was evaluated by plant personnel after 1 month and after 3 months by carefully slitting the bags, screening the contents on a one-half inch screen, and reporting the percentage of the material caked. Attempts were also made to evaluate the hardness of the lumped urea.

At the time the batches were made, a portion of each was evaluated by the accelerated test. Samples of unconditioned urea were tested at the same time. Cake hardness for the unconditioned urea from the two plants was not the same, numerically. It is possible that this variation is caused by different particle-size distribution, or by difference in initial water or biuret content. To put conditioner tests on the same basis, results of the test were calculated as a "caking index," said index computed by dividing the hardness of the unconditioned urea cake by the hardness of the conditioned cake.

Table I shows the caking index for five conditioner systems, as prepared at the two plants. For comparison, the percentage of lumps after 3-months storage is also shown. The data are plotted in FIG. 4 and indicate that the cake index in general follows the percent lumps.

TABLE I.—COMPARISON OF ACCELERATED TEST WITH BAG STORAGE TEST

| | Bag test | | Accelerated test | |
|---|---|---|---|---|
| | Percent lumps (3 months) | | Caking index | |
| | Plant A | Plant B | Plant A | Plant B |
| Conditioner system: | | | | |
| 1 | 6 | 16 | 36 | 12.5 |
| 2 | 15 | 7 | 22 | 10.2 |
| 3 | 100 | 100 | 1 | 1 |
| 4 | 36 | 39 | 18 | 15 |
| 5 | 36 | 79 | 2.1 | 0.8 |

All lumps reported medium hardness by both plants, except for System 1–Plant A.

Mirroring, as they do, the differences in preparation at two widely separated plants, by different personnel, on different substrates; storage under widely different climatic conditions; and evaluation by different operators, the data provide adequate verification of the test.

Figure 4:
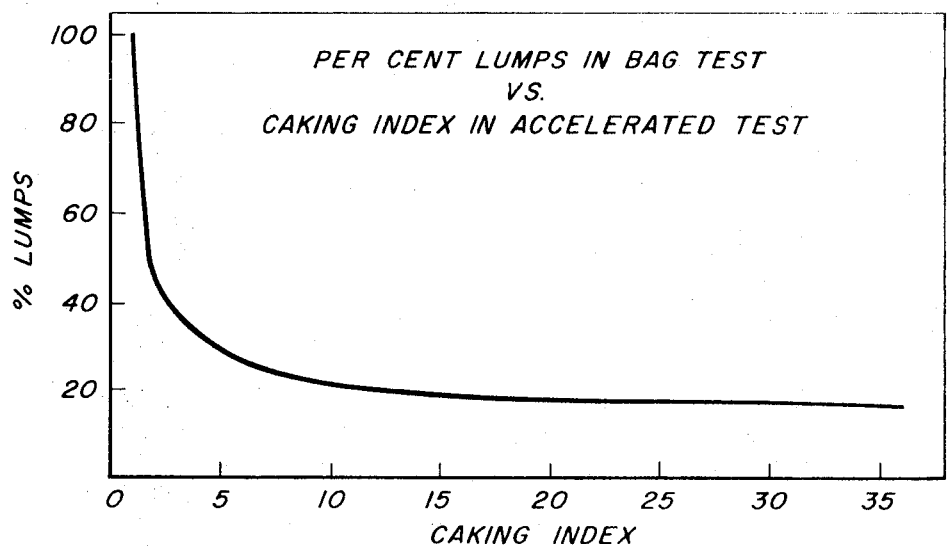
FIG. 4 is a plot of the caking index as obtained from the accelerated test method of this invention vs. the percent lumps in an actual inplant bag test and serves to illustrate the validity of the accelerated test method.

The data of FIG. 4 indicate that changes in the cake index between values of 1.0 and about 6.0 have profound effects on the percentage of lumps found in actual practice (i.e. the percent lumps varies from 100 percent TO 27 percent). However, as the index increases above 6.0 there seems to be little effect on the percent lumps (i.e. the percent lumps varies from 27 percent to only 18 percent). Thus the data indicate that in using the method of this invention to evaluate the efficacy of new urea anticaking agents, any agent having a cake index of 6.0 or greater would be most satisfactory. Those having an index less than 6.0 would offer varying degrees of efficacy. Most presently used commercial urea anticaking agents produce cake indices between 1.0 and 6.0.

The cake index is an extremely useful figure because it permits a quantitative comparison of the efficacy of various urea anticaking agents. Untreated urea will always have a cake index of 1.0 while urea treated with effective anticaking agents will show indices in excess of 1.0 with the magnitude of the difference from 1.0 being an indication of their efficacy. Ureas containing uneffective additives on the other hand will show an index of 1.0 or less.

The following examples are provided to further illustrate the invention.

EXAMPLE 1

This example illustrates the usefulness of the method of this invention in evaluating the efficacy of various anticaking additives for urea microprills on an accelerated basis.

A variety of anticaking agents were applied to urea microprills (−20 + 60 mesh containing about 0.2 to 0.3 percent water) from a given lot. An untreated sample from the same lot was selected as a control.

The control sample and the various treated samples were exposed to a first half cycle of 4 hours at 104° F. (dry bulb), 3 p.s.i.g., and 53 percent R. H. and a second half cycle of 2 hours at 68° F. (dry bulb), 3 p.s.i.g. and 81 percent R. H. for a total of 11.5 cycles. This corresponds to a total test time of only 70 hours or about 3 days. When the environmental cycles were completed, the crush strength of the urea cake in the mold was measured and the cake index computed therefrom. The equipment and procedures employed were as described hereinafter in the section devoted to this topic.

Results are shown below in Table II. It should be noted that the test procedure indicates that many of the additives do improve the anticaking characteristics of the urea. However, some have the opposite effect and produce a urea having an even greater tendency to cake than the untreated urea.

The additives shown in Table II are known urea anticaking agents. The cake index values of Table II confirm for the most part what is known about the efficacy of these particular additives from other sources such as bag tests. This confirmation indicates the usefulness and reliability of the method of this invention.

The data of Table II also indicate that the method is useful in determining the optimum amounts of each additive when one or more additives is employed.

EXAMPLE 2

This example illustrates the usefulness of the method of this invention in evaluating the efficacy of various anticaking additives for urea crystals on an accelerated basis.

The procedures of Example 1 were followed in all respects except that the urea microprills were replaced by urea crystals. Results are shown below in Table III. The same observations made with reference to the data of Table II in Example 1 also apply to the data of Table III.

TABLE III.—ACCELERATED CAKING TEST ON CONDITIONED CRYSTAL UREA

| Additive | Type | Producer | Percent additive | Average crush strength pounds | Caking index |
|---|---|---|---|---|---|
| None (control) | | | | 76.7 | 1.0 |
| R1045-43-2 | Starch | National starch | 2.0 | 35.4 | 2.2 |
| Stearic acid | | | 0.1 | | |
| R-1045-43-2 | Starch | National starch | 2.5 | 37.5 | 2.0 |
| Stearic acid | | | 0.1 | | |
| R-1045-43-1 | Starch | National starch | 2.5 | 39.6 | 1.9 |
| R977-113 | do | do | 2.0 | 42.1 | 1.8 |
| R1045-43-1 | do | do | 2.0 | 43.1 | 1.8 |
| Stearic acid | | | 0.1 | | |
| R977-113 | Starch | National starch | 2.5 | 46.1 | 1.7 |
| Stearic acid | | | 0.1 | | |
| Dryflo | Starch | National starch | 2.5 | 51.0 | 1.5 |
| Purity 825 | do | do | 2.0 | 59.0 | 1.5 |
| Hydroseal 3 | do | do | 2.0 | 64.8 | 1.2 |
| Dryflo and 1% Ca. stearate | do | do | 1.0 | 65.9 | 1.2 |
| Mistron ZSC | Diatomaceous earth | United Sierra | 2.0 | 69.7 | 1.1 |
| Mistron vapor | Diatomaceous | do | 2.0 | 87.9 | 0.9 |

TABLE II.—ACCELERATED TEST RESULTS OF UREA MICROPRILLS CONDITIONED WITH MISCELLANEOUS MATERIALS

| Additive | Percent additive | Average crush strength, lbs. | Caking index |
|---|---|---|---|
| None (control) | | 69.5 | 1.0 |
| Ca stearate | 0.25 | 6.3 | 11.0 |
| Tall oil fatty acid | 0.25 | 56.8 | 1.2 |
| Tall oil fatty acid / Kaolin | 0.25 / 2.5 | 16.7 | 4.2 |
| SD 3171 [2] | 0.10 | 63.6 | 1.1 |
| SD 3171 [2] / Kaolin [1] | 0.10 / 2.5 | 50.1 | 1.4 |
| SD 3171 [2] / Kaolin [1] | 0.25 / 2.5 | 21.2 | 3.3 |
| SD 3171 [2] / Kaolin [1] | 0.50 / 2.5 | 104 | 0.7 |
| Kaolin [1] | 3.0 | 43.4 | 1.6 |
| Georgia kaolin (Andersonville) | 3.0 | 44.2 | 1.6 |
| Calcium bentonite | 3.0 | 85.8 | 0.8 |
| Diatomaceous earth | 3.0 | 87.9 | 0.8 |
| Benpink ball clay [3] | 3.0 | 98.5 | 0.8 |
| Tenn K [4] clay | 3.0 | 98.0 | 0.7 |
| Sodium bentonite | 3.0 | >100 | <0.7 |
| Miss M and D [5] | 3.0 | >100 | <0.7 |
| Dark wad [6] | 3.0 | >100 | <0.7 |
| Pakistan ball clay [7] | 3.0 | >100 | <0.7 |
| Mineral oil / Kaolin [1] | 0.10 / 2.5 | 81.0 | 0.9 |
| Mineral oil / Kaolin [1] | 0.25 / 3.5 | 55.5 | 1.3 |
| Mineral oil / Kaolin [1] | 0.50 / 2.5 | 52.4 | 1.3 |
| Molojel [8] | 0.20 | 66.9 | 1.0 |
| Light waxol [9] | 0.20 | 70.5 | 1.0 |
| Isopar M [10] / Kaolin [1] | 0.10 / 2.5 | >100 | <0.7 |
| Isopar M [10] / Kaolin [1] | 0.25 / 2.5 | >97 | <0.7 |
| Isopar M [10] / Kaolin [1] | 0.50 / 2.5 | 82.3 | 0.8 |
| Cake curb [11] | 0.10 | >100 | <0.7 |
| Lauryl alcohol | 0.10 | >100 | <0.7 |
| Armeen L-11 [12] | 0.10 | >100 | <0.7 |

1. Barnet Clay, agricultural kaolin, 74 percent minus 1 micron (United Sierra)
2. Food grade fatty acid derivative (Armour)
3. Kentucky acidic clay—62 percent minus 1 micron (Kentucky-Tennessee Clay Co.)
4. Tennessee kaolin—54 percent minus 1 micron (United Sierra)
5. Miss. basic clay—83 percent minus 1 micron (Kentucky-Tennessee Clay Co.)
6. Tennessee acidic clay—25 percent minus 1 micron (Kentucky-Tennessee Clay Co.)
7. Coarse soda-lime feldspurs and alteration products
8. Branched chain paraffin (Witco Chemical)
9. Straight chain paraffin (Witco Chemical)
10. High purity isoparaffin (Esso)
11. Al, Ca, Mg salts of fatty acids (Chem. Indust., Inc.)
12. Fatty amine (Armour Chem. Co.)

EXAMPLE 3

This example illustrates the usefulness of the method of this invention in providing an accelerated quantitative basis for evaluating the effects of changes in the order of addition of anticaking additives upon the efficacy of the additives.

The procedures of Example 2 were followed in all respects. Results are shown below in Table IV.

TABLE IV.—EFFECT OF ORDER OF CONDITIONER APPLICATION ON CRYSTAL UREA

| Primary conditioner | Secondary conditioner | Crush strength, lb. |
|---|---|---|
| 0.5% fatty acid derivative | 2.5% Kaolin | 11.8 |
| 2.5% Kaolin | 0.5% fatty acid derivative | 22.1 |
| 0.5% fatty acid derivative (added to urea at the same time) 2.5% Kaolin | | 35.2 |
| 0.5% fatty acid derivative (Kaolin treated with fatty acid derivative) 2.5% Kaolin | | 42.9 |

EXAMPLE 4

The procedures of Example 1 were followed in all respects except that the environmental cycle consisted of a first half cycle of 8 hours at 90° F. (dry bulb), 2 p.s.i.g., and 10 percent R. H. and a second half cycle of 1 hour at 60° F. (dry bulb), 2 p.s.i.g., and 70 percent R. H. Six such tests were run for each additive studied wherein the total number of cycles in each test was 2.5, 8.5, 11.5, 14.5, 17.5 and 20.5. The three additives studied were kaolin, calcium stearate, and tall oil fatty acid. The results were plotted as shown in FIG. 3 with the resulting plots in all cases being substantially as shown in FIG. 3. Satisfactory correlation of the results of the accelerated tests with inplant tests was also obtained.

EXAMPLE 5

The procedures of Example 1 were followed in all respects except that the environmental cycle consisted of a first half cycle of 2 hours at 120° F. (dry bulb), 6.0 p.s.i.g., and 60 percent R. H. and a second half cycle of 5 hours at 80° F. (dry bulb), 6.0 p.s.i.g., and 95—100 percent R. H. Six such tests were run for each additive studied wherein the total number of cycles in each test was 2.5, 8.5, 11.5, 14.5, 17.5 and 20.5 and the additives were those used in Example 4. As in Example 4, the resulting data plotted substantially as shown in FIG. 3. Satisfactory correlation of the results of the accelerated tests with inplant tests was also obtained.

We claim:
1. A method for determining, on an accelerated basis, the susceptibility to caking of urea or a urea containing an anticaking agent which comprises the steps of:
   a. subjecting said urea contained in a perforated mold to an environmental cycle consisting of a first half cycle of:
      i. from about 2 to about 8 hours at a dry bulb temperature of about 90° to 120° F., relative humidity below the critical humidity of urea at the temperature selected but greater than 10 percent, and a pressure of about 2 to 6.5 p.s.i.g., followed by a second half cycle of
      ii. from about 1 to about 5 hours at a dry bulb temperature of about 60° to 80° F., relative humidity of 70 to 100 percent and a pressure of about 2 to 6.5 p.s.i.g. for a total number of cycles ranging from 2½ to 20½, ending at the end of a first half cycle, and then
   b. measuring the crush strength of said treated urea.

2. The method of claim 1 wherein the first half cycle conditions are:
   100° to 110° F. (dry bulb)
   50 to 55 percent relative humidity
   3 to 4 p.s.i.g.
   4 to 6 hours
and the second half cycle conditions are:
   68° to 70° F. (dry bulb)
   78 to 82 percent relative humidity
   3 to 4 p.s.i.g.
   1 to 3 hours 3. The method of claim 2 wherein the number of cycles is from about 8½ to 15½.

4. The process of claim 3 wherein the first half cycle conditions are:
   104° F. (dry bulb)
   53 percent relative humidity
   3 p.s.i.g.
   4 hours
and the second half cycle conditions are about:
   68° F. (dry bulb)
   81 percent relative humidity
   3 p.s.i.g.
   2 hours
and wherein the number of cycles is 11½.